(12) United States Patent
Schaevitz et al.

(10) Patent No.: US 7,879,501 B2
(45) Date of Patent: Feb. 1, 2011

(54) SYSTEMS AND METHODS FOR PROCESSING FUEL FOR FUEL CELLS

(75) Inventors: Samuel B. Schaevitz, Fremont, CA (US); Aleksander Franz, Winchester, MA (US)

(73) Assignee: Lilliputian Systems, Inc., Wilmington, MA (US)

( * ) Notice: Subject to any disclaimer, the term of this patent is extended or adjusted under 35 U.S.C. 154(b) by 1148 days.

(21) Appl. No.: 11/581,259

(22) Filed: Oct. 11, 2006

(65) Prior Publication Data

US 2008/0090114 A1 Apr. 17, 2008

(51) Int. Cl.
*H01M 8/06* (2006.01)
*H01M 8/10* (2006.01)

(52) U.S. Cl. .................................. 429/423; 429/479

(58) Field of Classification Search ............. 429/17–20, 429/30
See application file for complete search history.

(56) References Cited

U.S. PATENT DOCUMENTS

| | | | |
|---|---|---|---|
| 6,126,908 | A | 10/2000 | Clawson et al. |
| 6,939,632 | B2 | 9/2005 | Arana et al. |
| 2002/0031690 | A1 | 3/2002 | Shimazu et al. |
| 2004/0043273 | A1 | 3/2004 | Jankowksi et al. |
| 2004/0072039 | A1 | 4/2004 | Jankowski et al. |
| 2004/0163311 | A1 | 8/2004 | Ahmed et al. |
| 2004/0179980 | A1 | 9/2004 | Pattekar et al. |
| 2004/0223908 | A1 | 11/2004 | Holladay et al. |
| 2004/0241061 | A1 | 12/2004 | Takai et al. |
| 2005/0008907 | A1* | 1/2005 | Isozaki et al. ............... 429/20 |
| 2005/0008909 | A1 | 1/2005 | Kaye et al. |
| 2005/0008911 | A1 | 1/2005 | Kaye |
| 2005/0014040 | A1 | 1/2005 | Kaye |
| 2005/0014059 | A1 | 1/2005 | Kaye |
| 2005/0069737 | A1 | 3/2005 | Nomura et al. |
| 2005/0132648 | A1 | 6/2005 | Miyahara et al. |
| 2005/0186455 | A1 | 8/2005 | Kaye et al. |
| 2005/0191534 | A1* | 9/2005 | Kim et al. ............... 429/20 |
| 2005/0207953 | A1 | 9/2005 | Upadhye et al. |
| 2005/0252081 | A1 | 11/2005 | Kim et al. |
| 2005/0255368 | A1 | 11/2005 | Kaye et al. |
| 2006/0068247 | A1* | 3/2006 | Kuwata et al. ............... 429/20 |
| 2006/0283584 | A1* | 12/2006 | Arana et al. ............... 165/177 |

FOREIGN PATENT DOCUMENTS

| | | |
|---|---|---|
| EP | 1650159 | 4/2006 |
| WO | WO-2006057158 | 6/2006 |
| WO | WO-2006069057 | 6/2006 |

* cited by examiner

*Primary Examiner*—Patrick Ryan
*Assistant Examiner*—Karie O'Neill Apicella
(74) *Attorney, Agent, or Firm*—Sunstein Kann Murphy & Timbers LLP (57) ABSTRACT

Presented herein is a fuel cell assembly, including a reformer housing, a reformer region within the reformer housing for producing hydrogen, a vacuum housing for containing the reformer housing, a low-pressure insulating region between the reformer housing and the vacuum housing for providing thermal insulation, radiation shields disposed about the reformer region for providing radiation insulation, and at least one proton-exchange-membrane fuel cell in fluid communication with the reformer region. The vacuum housing may define a volume of less than about 30 cubic centimeters. The fuel cell assembly may produce less than about 100 watts of power. Also disclosed are related methods for reforming fuel.

16 Claims, 4 Drawing Sheets

SYSTEMS AND METHODS FOR PROCESSING FUEL FOR FUEL CELLS

BACKGROUND

Fuel cells produce electricity from chemical reactions. The chemical reactions typically react a fuel, such as hydrogen, and air/oxygen as reactants, and produce water vapor as a primary by-product. The hydrogen can be provided directly, in the form of hydrogen gas or liquid, or can be produced from other materials, such as hydrocarbon liquids or gasses. Fuel cell assemblies may include one or more fuel cells in a fuel cell housing that is coupled with a fuel canister containing the hydrogen and/or hydrocarbons. Fuel cell housings that are portable coupled with fuel canisters that are portable, replaceable, and/or refillable, compete with batteries as a preferred electricity source to power a wide array of portable consumer electronics products, such as cell phones and personal digital assistants. The competitiveness of these fuel cell assemblies when compared to batteries depends on a number of factors, including their size, efficiency, and reliability.

Providing hydrogen directly to fuel cell assemblies is typically not suitable for portable fuel cells. Hydrogen gas has a low energy density, and thus large volumes of hydrogen gas may be needed in order to provide a sufficient amount of energy to an electronic product. Liquid hydrogen typically must be stored at low temperatures and high pressure, making its storage difficult. Thus, hydrocarbon fuel sources are typically preferred for portable fuel cells.

However, hydrocarbon fuel sources are not typically suitable for direct use with fuel cells. More particularly, hydrocarbons, when used directly with fuel cells, leave carbon deposits and/or soot on the fuel cells. This can reduce the efficiency of the fuel cells and in some cases render them inoperable. For instance, fuel cell electrodes typically include pores for allowing gas to flow through to contact and react with electrolyte membranes, as will be discussed below. Carbon deposits on the fuel cells, however, may block the pores in the electrodes. The carbon deposits within the pores may also provide electrical short-circuit paths between the electrodes, thereby eliminating voltage gain of the fuel cell.

Hydrocarbon fuel also produces carbon monoxide, which bonds to active sites on the electrolyte membrane, resulting in carbon monoxide poisoning of the electrode and reducing fuel cell performance. The carbon monoxide must be cleaned off the membrane, for example with oxygen.

Thus, hydrocarbon fuels are typically reformed to produce hydrogen gas for fuel cells. However, many existing fuel cells that include hydrocarbon reformers are not suitable for portable use. More particularly, there is a need in existing systems and methods for portable fuel cells that provide better heat insulation to maintain the operating temperature of the fuel cell and to protect an end-user. There is also a need for smaller insulation size, to allow for decreased fuel cell size. Moreover, there is a need for systems and methods that have improved thermal management so that heat can be routed and shared between fuel cell components to allow the components to operate at high efficiencies. There is also a need for systems that use multiple reformers, and it is desired that the multiple reformers are maintained at particular temperatures that improve their efficiencies. Finally, it is desired that these components are housed in a portable structure suitable for use in portable electronics applications.

SUMMARY

This invention, in various embodiments, addresses deficiencies in the prior art by providing a fuel cell assembly that includes one or more reformer regions that produce hydrogen for use with a fuel cell. The systems and methods provide improved thermal management by providing insulation, both in the form of thermal conductive insulation and radiation insulation. The systems and methods also provide improved thermal management by thermally coupling various fuel cell components so that heat can be routed and shared among components to improve the efficiency of the fuel cell. Moreover, the systems and methods route exhaust from certain fuel cell components to other fuel cell components that can use the exhaust to, for example, produce usable hydrogen or heat for the fuel cell assembly. In certain configurations, the systems and methods include multiple reformer regions, and the respective temperatures of each of the reformer regions are chosen to increase the efficiency of the fuel cell assembly. In one aspect, the fuel cell assemblies described herein are suitable for use with portable electronics by producing less than about 100 watts of power and/or including reformer housings less than about 30 cubic centimeters.

In one aspect, the systems and methods include a fuel cell assembly, comprising a reformer housing, a reformer region within the reformer housing for producing hydrogen, a vacuum housing for containing the reformer housing, a low-pressure insulating region between the reformer housing and the vacuum housing for providing thermal insulation, radiation shields disposed about the reformer region for providing radiation insulation, and at least one proton-exchange-membrane fuel cell in fluid communication with the reformer region, wherein the vacuum housing defines a volume of less than about 30 cubic centimeters. In certain configurations, the at least one fuel cell produces a voltage differential of less than about 10 volts. In certain configurations, the at least one fuel cell produces less than about 100 watts of power.

In one feature, the systems and methods include a tube in fluidic communication with the reformer region for delivering fuel to the reformer region, wherein at least a portion of the tube has a wall-thickness of less than about 50 microns. According to another feature, the systems and methods include a heating element thermally coupled to the reformer region for heating the reformer region, and a conduit in fluidic communication with the fuel cell and the heating element for providing exhaust from the fuel cell to the heating element. The conduit may be in fluidic communication with one or more anodes of the at least one fuel cell and is for providing one or more of hydrogen, water, and carbon monoxide to the heating element. Additionally or alternatively, there may be a conduit in fluidic communication with one or more cathodes of the at least one fuel cell and the heating element for providing oxygen to the heating element.

In various embodiments, the reformer region comprises at least one of a steam reformer, an aqueous shift reformer, a thermal cracking reformer, and a preferential oxidation reformer. The reformer region may also comprise an exothermic reformer, such as a partial oxidation reformer. In some configurations, the reformer region produces hydrogen at a temperature of more than about 300 degrees Celsius. The reformer region may comprises a partial oxidation reformer for producing hydrogen and for maintaining the temperature of the reformer region at more than about 300 degrees Celsius. The reformer and the fuel cell may be thermally coupled.

In certain configurations, there is also a second reformer region at a lower temperature than the first reformer region for at least one of burning carbon-monoxide and producing additional hydrogen. There may also be a third reformer region at a lower temperature than the second reformer region for producing additional hydrogen. In one configuration, the reformer region comprises a first end at a first temperature for receiving fuel and providing hydrogen, a second end at a second temperature for providing hydrogen, and a temperature gradient between the first end and the second end, wherein the first temperature is higher than the second temperature.

In another aspect, the systems and methods include a fuel cell assembly, comprising a reformer housing, a reformer region within the reformer housing for producing hydrogen, a vacuum housing for containing the reformer housing, a low-pressure insulating region between the reformer housing and the vacuum housing for providing thermal insulation, radiation shields disposed on the inner walls of the vacuum housing for providing thermal insulation, and at least one proton-exchange-membrane fuel cell in fluid communication with the reformer region, wherein the fuel cell produces less than about 100 watts of power. According to one embodiment, the radiation shields are not attached to the vacuum housing.

In still another aspect, the systems and methods include a method for operating a fuel cell, comprising providing fuel to a reforming region, reforming, by the reforming region, the fuel to produce at least hydrogen, maintaining a low pressure region around the reformer region, providing radiation insulation to the reforming region, delivering the hydrogen to a proton-exchange-membrane fuel cell, and producing, by the fuel cell, less than about 100 watts of power. In certain configurations, the fuel cell produces a voltage differential of less than about 10 volts.

Providing thermal insulation may comprise maintaining a vacuum around the reformer region. Providing radiation insulation may comprise providing a housing for containing the reformer region, and disposing reflective shields on inner surfaces of the vacuum housing.

In one feature, the methods also include thermally coupling the reformer region to a heating element, and heating, by the heating element, the reformer region.

The methods may include delivering exhaust from the fuel cell to the heating element. In certain configurations, the methods include delivering exhaust from an anode of the fuel cell to the heating element, delivering at least oxygen from the cathode of the fuel cell to the heating element, and reacting the exhaust and oxygen to produce heat.

In certain configurations, reforming the fuel comprises exothermically reacting the fuel. The reformer region itself may maintain the temperature of the reformer region at more than about 300 degrees Celsius. The methods may include thermally coupling the fuel cell and the reformer region. Reforming the fuel to produce at least hydrogen may comprise producing an exhaust comprising less than about 5% carbon monoxide.

BRIEF DESCRIPTION OF THE DRAWINGS

These and other features and advantages will be more fully understood by the following illustrative description with reference to the appended drawings, in which like elements are labeled with like reference designations, and in which fluidic connections and fuel cell components are intended to represent the interrelation of the connections and components but may not depict the actual physical location of the connections and components. The drawings may not be drawn to scale.

DETAILED DESCRIPTION OF ILLUSTRATIVE EMBODIMENTS

The invention, in various embodiments, provides devices and methods for portable fuel cell assemblies and/or methods of processing fuel for portable fuel cells. The following detailed description of the invention refers to the accompanying drawings. The following detailed description does not limit the invention. Instead, the scope of the invention is defined by the appended claims and equivalents.

Figure 1:
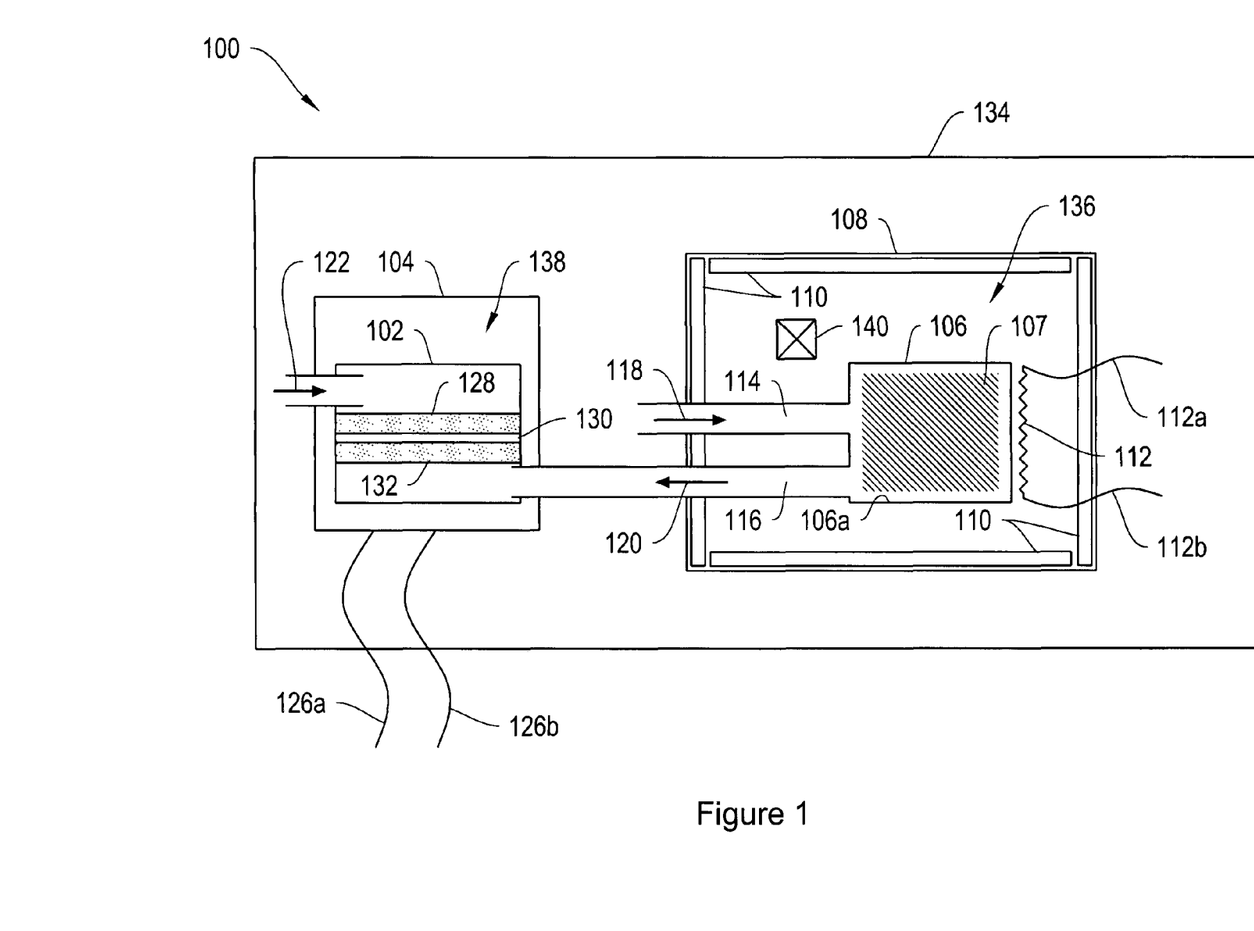
FIG. 1 shows a fuel cell assembly including a fuel cell and a hydrocarbon reformer region according to an illustrative embodiment of the invention.

FIG. 1 shows a fuel cell assembly 100 including a fuel cell 102 and a hydrocarbon reformer region 107 that provides a hydrogen-rich gas stream 120 to the fuel cell 102. The fuel cell includes an anode 132, a cathode 128, and an electrolyte membrane layer 130 disposed between the anode 132 and the cathode 128. The fuel cell 102 produces electricity when a hydrogen-rich gas stream 120 that includes hydrogen contacts the anode 132, and oxygen or air contacts the cathode 128. The oxygen or air flows to the cathode 128 through a conduit 122, and may originate from ambient air outside the fuel cell assembly 100, or from a canister or cartridge (not shown) containing oxygen-rich gas. The hydrogen-rich gas stream 120 is produced by the reformer region 107, as will be discussed in more detail below, and then flows to the anode 132 through the conduit 116.

The anode 132 and cathode 128 may be porous, and a catalyst (e.g., a platinum based catalyst) is optionally disposed at the interface of the anode 132 and the electrolyte layer 130 and/or at the interface of the cathode 128 and the electrolyte layer 130. Hydrogen and oxygen electrochemically react with the anode 132, the cathode 128, the electrolyte membrane 130, and (optionally) the catalyst (not shown) to produce a voltage differential between the anode 132 and the cathode 128. This voltage differential is accessed by the electrical power leads 126a and 126b, which can electrically connect to a load (not shown) to drive electrical current and power the load. The fuel cell 102 produces exhaust that generally includes water, carbon monoxide, carbon dioxide, oxygen, and/or unreacted hydrogen. As will be discussed below, in certain implementations this exhaust is routed to other heating elements and/or to the reformer region 107. In these implementations, the fuel cell makes use of the exhaust rather than wasting it by venting it to ambient air outside the assembly 100 or burning it off with a tail gas burner. Although the depicted fuel cell 102 includes a single fuel cell structure (i.e., a single anode 132, a single cathode 128, and a single electrolyte 130 disposed therebetween), other configurations are possible. The fuel cell 102 can include a plurality of fuel cells which may be electrically connected in series to produce a higher voltage differential, or electrically connected in parallel to drive more current. The fuel cells can be oriented in a vertical stack or in a planar stack. In certain embodiments, the fuel cell 102 produces a voltage differential of less than about 10 volts, and/or less than about 100 watts of power. In other embodiments, the fuel cell 102 produces a voltage differential of less than about 100 volts, about 50 volts, about 25 volts, or about 15 volts.

As mentioned, the hydrogen-rich gas stream 120 that contacts the anode 132 originates from the reformer region 107 that is located within a reformer housing 106. The reformer region 107 produces the hydrogen rich gas stream 120 from a fuel stream 118. The fuel stream 118 enters the reformer housing 106 through the conduit 114. The conduit 114, and all other conduits described herein, may include valves, such as microvalves, for controlling the rate of fluid flow through that conduit, or may otherwise be fabricated with certain sizes to yield a desired fluid flow rate. Exemplary configurations for conduit 114 and the other conduits depicted herein will be described below in connection with FIG. 4. The fuel stream 118 can be any fluid, such as a hydrocarbon, that can be reformed to produce and/or isolate hydrogen gas. The fuel stream 118 may include gasses including molecules having the formula $C_nH_mO_p$ where n and m are positive numbers and p can be positive or zero. Exemplary types of fuel include hydrocarbon based fuels such as methane, ethane, methanol, butane, pentane, methanol, formic acid, ethanol, and/or propane, and/or non-hydrocarbon based fuels such as ammonia or hydrazine. A more exhaustive list of possible fuels are listed below and in the references cited herein.

The fuel stream 118 enters the reformer housing 106, flows through the reformer region 107, and participates in chemical reactions that produce the hydrogen-rich gas stream 120. In certain embodiments, the chemical reactions are between the fuel stream 118 and catalysts disposed in the reformer region 107. Additionally, the reactions may include other gasses provided to the reformer region 107. In various embodiments, gasses and/or catalysts added to the fuel stream 118 may be added before the fuel stream 118 enters the conduit 114, inside the conduit 114, inside the reformer housing 106, or inside the reformer region 107. The chemical reactions typically occur when the reformer region 107 is subjected to heat provided by a heating element. The type of heating element, the amount of heat, as well as the type of catalyst used depends on a manufacturer's preference and/or the type of reformer 107 used. Exemplary types of reformers include a partial oxidation reformer, a steam reformer, a water-gas-shift reformer (aqueous shift reformer), a preferential oxidation reformer, a selective oxidation reformer, or a thermal cracking reformer. Each reformer type may have its own heating and catalyst requirements, as will be discussed below.

The heating element can be an electrical heating element or a chemical heating element. The depicted heating element 112 is an electrical resistive heating element 112. In use, a voltage differential is applied to heater leads 112a and 112b to drive a current between the leads 112a and 112b. The resistive heating element 112 is made of a material that has sufficient resistance to generate heat when resisting this flow of current. Exemplary materials suitable for this use include thin-film platinum, gold, graphite, nickel, chromium, aluminum, alloys thereof, or other base metals. In one exemplary fabrication technique, a manufacturer deposits the resistive material onto a substrate using a deposition technique such as sputtering, vacuum evaporation, chemical vapor deposition, laser ablation, dip coating, or vapor spray techniques to form the heating element 112. Next, the manufacturer places the heating element 112 in sufficient proximity to the reformer region 107 such that heat from the heating element 112 can flow to and heat the reformer region 107. In certain implementations, the heating element 112 and the reformer housing 106 are in physical contact. The manufacturer then applies a voltage differential source to the heating leads 112a and 112b using, for example, a battery (i.e., a rechargeable microbattery), a rechargeable capacitor, or another suitable power source. Alternative heating elements that are chemical rather than electrical will be discussed in more detail in connection with FIG. 4.

In certain embodiments, such as when reformer region 107 is a steam reformer or a thermal cracking reformer, the reformer region 107 operates using endothermic reactions and should be maintained at a high temperature. In these situations, the heating element 112 can provide the heat to drive the reactions and to maintain the operating temperature of the reformer region 107. In other embodiments, such as when the reformer region 107 is a partial oxidation reformer, the reformer region 107 operates using exothermic reactions which provide enough heat to maintain the operating temperature of the reformer region 107. In these situations, the heating element 112 can be used for a short duration of time when the fuel cell assembly 100 is turned on to provide the heat necessary to initiate the exothermic reactions in reformer region 107. When the reformer region 107 begins generating enough heat to sustain itself, the heating element 112 can be turned off. In certain embodiments, the heating element is equipped with one or more temperature sensors so that it can sense the temperature of the reformer region 107 and thereby automatically turn on, turn off, produce more heat, or produce less heat in accordance with its temperature readings.

As mentioned above, when subjected to heat (e.g., heat provided by the heating element 112 or the exothermic reactions of the reformer region 107), the fuel stream 118 reacts with a catalyst to produce hydrogen. The catalyst can be disposed in the reformer region in a variety of ways. In certain embodiments, the catalyst is coated on the inner walls 106a of the reformer housing 106 so that the fuel stream 118 contacts the catalyst when flowing within the reformer region 107. In other embodiments, the reformer region includes a substrate with etched microchannels that are coated or filled with the catalyst, through which the fuel stream 118 flows. In still other embodiments, the catalyst is coated onto a metallic sponge or foam-like material, and the sponge or foam-like material is deposited into the reformer housing 106. The fuel stream 118 flows through the interstices of the sponge or foam and contacts the catalyst. In still other embodiments, the catalyst is provided in the form of pellets or small spheres packed to form a porous bed or otherwise suitably filled into the volume of reformer housing 106. The pellets may have diameters ranging from between about 20 microns to about 1 millimeter, and the size of the pellets chosen may vary depending on the size of the reformer housing 106. Combinations of the above-described configurations may also be used. For example, the reformer region 107 may include microchannels etched into a substrate that are filled with the above-described sponge or foam and/or the above-described pellets. The type of catalyst may vary depending on the type of reformer used in reformer region 107. Exemplary catalyst materials include platinum, rhodium, ruthenium, iridium, nickel, rare earth oxides, palladium, cobalt, tin, oxides thereof, or composites thereof.

As mentioned above, the type of catalyst used, the type of additional gasses provided to the reformer region 107, and the amount of heat provided by the heating element 112 may vary depending on the type of reformer used. For example, when reformer region 107 is a partial oxidation reformer, the partial oxidation reformer generally reacts the fuel stream 118 with oxygen gas in the presence of a catalyst and heat to produce the hydrogen-rich gas stream 120 that includes hydrogen, and, in some cases, varying amounts of water, carbon dioxide, and carbon monoxide. The oxygen gas can be provided to the reformer region 107 through a conduit (not shown) that is coupled to ambient air outside the fuel cell assembly 100, from a canister or cartridge (not shown) containing oxygen-rich gas, or by mixing oxygen with the fuel stream 118 outside the vacuum housing 108. In addition or in the alternative, the oxygen may be provided by a conduit (not shown) that delivers oxygen from cathode 128 exhaust to the reformer region 107. In any of the above cases, oxygen may be provided in pure form, or more preferably as a component of ambient air.

When the reformer region 107 is a partial oxidation reformer, the amount of carbon monoxide included in the hydrogen-rich gas stream 120 can be reduced by increasing the amount of oxygen provided to the reformer region 107. In certain embodiments, a sufficient amount of oxygen is provided such that the carbon monoxide in the hydrogen-rich gas stream 120 makes up less than about 5 percent of the hydrogen-rich gas stream 120, which is beneficial at least in part because excessive carbon monoxide can damage the fuel cell membrane 130. In one embodiment, the fuel stream 118 is a butane fuel stream, and carbon monoxide is limited to less than about 5 percent of the hydrogen-rich gas stream 120 by providing more than about 21 sccm ambient air to the reformer region 107 per sccm butane.

As mentioned above, when the reformer region 107 is a partial oxidation reformer, it produces the hydrogen-rich gas stream 120 with exothermic reactions. Thus, the heating element 112 is only needed to provide initial heat to initiate the reformer reactions. In certain implementations, the heat generated by the heating element 112 results in a temperature of the partial oxidation reformer between about 200 degrees Celsius and about 800 degrees Celsius. Thereafter, the partial oxidation reformer maintains its temperature at a similar level, between about 200 degrees Celsius and about 800 degrees Celsius. In certain embodiments, the partial oxidation reformer maintains itself at a temperature between about 300 degrees Celsius and about 500 degrees Celsius, or at a temperature of more than about 200 degrees Celsius, more than about 300 degrees Celsius, more than about 400 degrees Celsius, or more than about 500 degrees Celsius. The partial oxidation reformer may also maintain itself at a temperature of less than about 200 degrees Celsius, less than about 300 degrees Celsius, less than about 400 degrees Celsius, less than about 500 degrees Celsius, or less than about 800 degrees Celsius. According to various embodiment, the partial oxidation reformer maintains itself at a temperature that is within about 10 degrees, about 15 degrees, about 20 degrees, about 25 degrees, or about 50 degrees of the initial temperature set by the heating element 112. Alternatively, the reformer region 107 may be a steam reformer. A steam reformer 107 generally reacts the fuel stream 118 with water vapor to produce the hydrogen-rich gas stream 120 that includes hydrogen and, in some cases, varying amounts of carbon monoxide, carbon dioxide, and water. The water may be provided through a conduit (not shown) that delivers water from an outside water source. Additionally or alternatively, the water may be provided by a conduit (not shown) that delivers water from the exhaust of the fuel cell 102 to the reformer region 107. Using water in the reformer region 107 is beneficial at least in part because, in addition to the reformer isolating hydrogen from the fuel stream 118, the reformer isolates additional hydrogen from the water itself, thus increasing the overall concentration of hydrogen in the hydrogen-rich gas stream 120. As mentioned above, a steam reformer produces the hydrogen-rich stream 120 with endothermic reactions and the heating element 112 may provide the heat consumed by the reformer region 107. In certain embodiments, the steam reformer region 107 is maintained at a temperature of between about 700 degrees Celsius and about 1100 degrees Celsius. In other embodiments, the steam reformer may be maintained between about 200 degrees Celsius and about 800 degrees Celsius, between about 300 degrees Celsius and about 500 degrees Celsius, or at a temperature of more than about 200 degrees Celsius, more than about 300 degrees Celsius, more than about 400 degrees Celsius, more than about 500 degrees Celsius, more than about 700 degrees Celsius, or more than about 1000 degrees Celsius. According to various embodiment, the steam reformer maintains itself at a temperature that is within about 10 degrees, about 15 degrees, about 20 degrees, about 25 degrees, or about 50 degrees of the initial temperature set by the heating element 112.

In certain embodiments, the reformer region 107 is a hybrid of a partial oxidation reformer and a steam reformer. More particularly, both oxygen gas and water are provided to the reformer region 107 to react with the fuel stream 118 and the catalyst to produce a hydrogen-rich gas stream 120 that includes hydrogen and, in some cases, varying amounts of carbon monoxide, carbon dioxide, and water. The hybrid reformer may be maintained at a selected temperature, such as any of the temperatures or temperature ranges listed above for the partial oxidation reformer and the steam reformer.

In yet another alternative configuration, the reformer region 107 is a thermal cracking reformer, which may be beneficial at least in part because unlike the above-described reformers, a thermal cracking reformer can operate without additional fluids, such as oxygen or water. A thermal cracking reformer applies sufficient heat to decompose the molecules in the fuel stream 118 into hydrogen and other substances. By way of example, formic acid ($CH_2O_2$) spontaneously decomposes into a mixture of hydrogen, and varying amounts of carbon dioxide, carbon monoxide, oxygen, and/or water. Heavy hydrocarbons, including those with more than 3 carbon atoms per molecule, may also be well suited for this use in a thermal cracking reformer. In certain implementations, when the reformer region 107 is a thermal cracking reformer, the heating element 112 maintains the temperature of the reformer region 107 at between about 500 degrees Celsius and about 900 degrees Celsius. The reformer region 107 may also be maintained at about any of the temperatures listed above with respect to the partial oxidation reformer and the steam reformer.

As mentioned above, in certain embodiments, the operating temperature within the reformer housing 106 is more than 400 degrees C., and in other embodiments, the operating temperature can be greater than 1000 degrees C. Thus, to help maintain this temperature and in order to protect an end-user from these high temperatures, the reformer housing 106 is housed in a vacuum housing 108 that is thermally isolated from the reformer housing 106 by an insulating volume 136. The insulating volume 136 may include a variety of insulating materials with low thermal conductance. In other embodiments, the insulating volume includes a low pressure region and in some cases includes a vacuum. A vacuum in the insulating volume 136 can be formed by using a vacuum pump, a sublimation pump, by using an outgassing port, and/or by fabricating the vacuum housing 108 in vacuum conditions. In addition, or in the alternative, a getter material 140 absorbs background gasses and maintains vacuum-like conditions in the insulating volume 136. In certain embodiments, the getter material 140 is a non-evaporable getter, which can be activated through electrical heating, IR heating, or other means known in the art. In other embodiments, the getter material 140 is an evaporable getter, which evaporates when it reaches a certain temperature. In further embodiments, the getter material 140 is a thin film getter, or a thin film absorber.

A vacuum, however, may not prevent/eliminate the heat loss due to radiation. Thus, the vacuum housing 108 includes radiation reflectors 110 on its inner surfaces to provide radiation insulation. The reflectors 110 can include a metallic coating which is deposited on the inner surfaces of the vacuum housing 108. For example, the reflectors 110 can include metallic or infrared reflective material which is mechanically attached to the inner surfaces of the vacuum wall. In addition, a series of parallel infrared reflectors can be provided between the inner and outer surfaces of the vacuum housing 108. The reflectors 110 may be disposed on the inner walls of the vacuum housing 108 as plating treatments of gold or aluminum. The radiation reflectors 110 may be included in any of the exemplary fuel cell assemblies described herein. In certain embodiments, the vacuum housing defines a volume of between about 0.1 cubic centimeters and about 100 cubic centimeters, between about 0.1 cubic centimeters and about 30 cubic centimeters, between about 0.1 cubic centimeters and about 10 cubic centimeters, between about 1 cubic centimeter and about 5 cubic centimeters, or between about 5 cubic centimeters and 50 cubic centimeters.

The fuel cell 102 may also operate at high temperatures. Thus, in certain embodiments, the fuel cell 102 is housed in a second vacuum housing 104 that is thermally isolated from the fuel cell 102 by an insulating volume 138. The insulating volume 138 is similar to the insulating volume 136, and the second vacuum housing 104 may also be disposed with radiation reflectors similar to the radiation reflectors 110. In another embodiment, the insulating volume 138 is a not a vacuum housing, and provides non-vacuum insulation. For example, the insulating volume may be filled with aerogel insulation.

Figure 2:
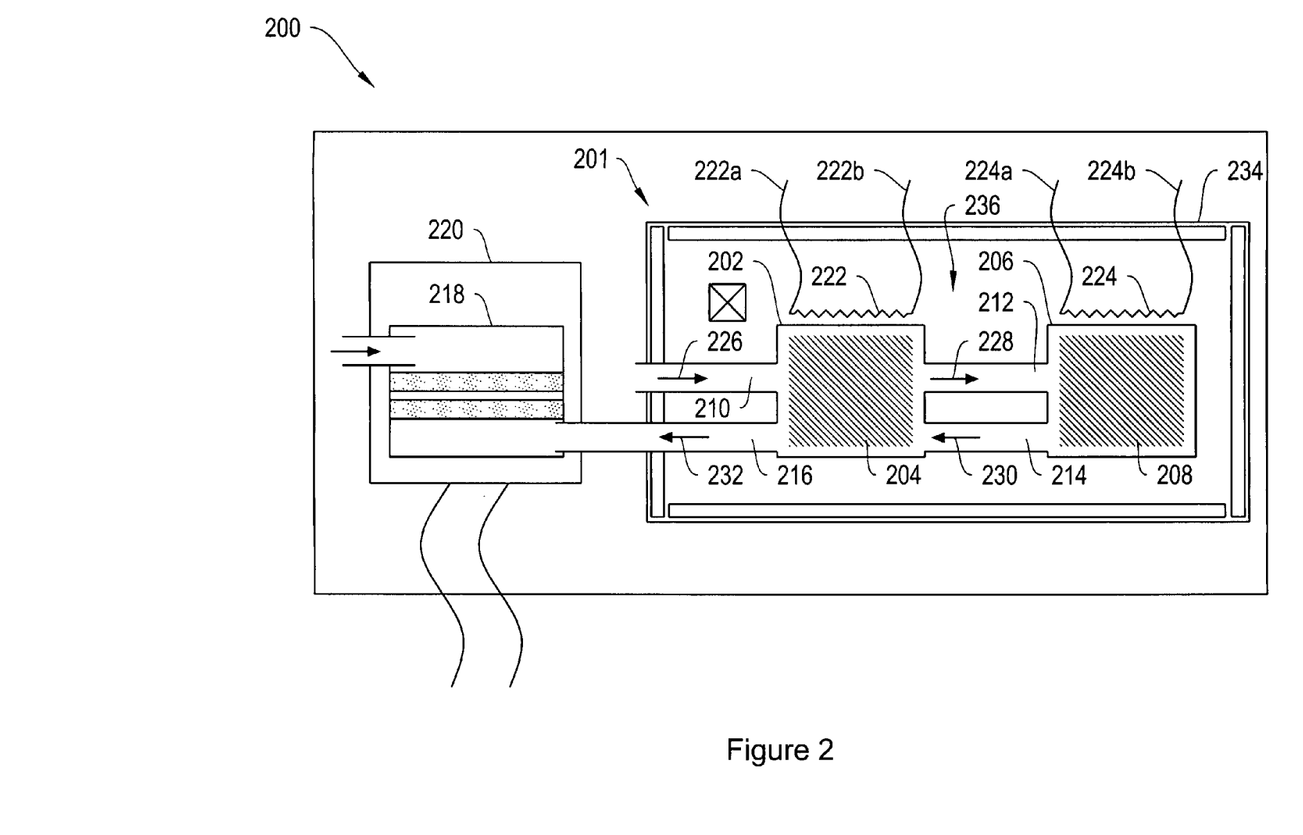
FIG. 2 shows a fuel cell assembly including a fuel cell and two hydrocarbon reformer regions according to an illustrative embodiment of the invention.

FIG. 2 shows a fuel cell assembly 200 according to an illustrative embodiment of the invention that includes a fuel cell 218 similar to the fuel cell assembly 100 of FIG. 1. Fuel cell assembly 200, however, includes a reformer assembly 201 having two hydrocarbon reformer regions 204 and 208. The first reformer region 204, contained in a first reformer housing 202, is substantially similar to the reformer region 107 of FIG. 1, and can comprise any of the varying embodiments and features described above in connection therewith. The second reformer region 208, contained in a second reformer housing 206, may improve the efficiency of the reformer assembly 201 by producing additional hydrogen from the exhaust of the first reformer region 204. The second reformer region 208 may also burn carbon monoxide from the exhaust of the first reformer region. As mentioned above, carbon monoxide can damage the fuel cell 218 if allowed to contact the components of the fuel cell 218. Similar to the configuration in FIG. 1, the first and second reformer housings 202 and 206 are contained in a vacuum housing 234 with a thermally insulating vacuum region 236 disposed between the housings 202/206 and the vacuum housing 234.

More particularly, a fuel stream 226, similar to fuel stream 118 of FIG. 1, flows to the first reformer region 204. As mentioned above in connection with the reformer region 107 in FIG. 1, the first reformer region 204 can, in various configurations, produce an exhaust stream of water, carbon dioxide, and carbon monoxide in addition to hydrogen. An exhaust stream 228 from the first reformer region 204 flows through conduit 212 to the second reformer region.

In one configuration, the second reformer region 208 is a water-gas-shift reformer, which generally reacts carbon monoxide and water from the exhaust stream 228 to produce carbon dioxide and hydrogen. If the exhaust stream 228 does not have a sufficient amount of water, then water can be delivered to the second reformer region 208 by a conduit (not shown) either from the water exhaust of the fuel cell 218 or from a separate water source (not shown). In another configuration, the second reformer region 208 comprises a preferential oxidation reformer 208 which generally reacts carbon monoxide with oxygen to produce carbon dioxide.

The second reformer produces a fluid stream 230 which flows through conduit 214 to the first reformer region 204, or exits directly to the fuel cell 218. The first reformer region 204 produces the hydrogen-rich stream 232, which is then transported through conduit 216 to the fuel cell 218.

Water-gas-shift reformers and preferential oxidation reformers generally burn carbon monoxide and/or produce hydrogen using exothermic reactions. Thus, a heating element 224 with heating element leads 224a and 224b, similar to the heating element 112 of FIG. 1, can be used to provide the initial heat required to initiate the water-gas-shift reactions. Thereafter the water-gas-shift reformer may produce enough heat to maintain its own operating temperature. Exemplary operating temperatures for a water-gas-shift reformer may be between about 150 degrees Celsius to about 700 degrees Celsius and exemplary operating temperatures for a preferential oxidation reformer can be between about 70 degrees Celsius and about 400 degrees Celsius. The water-gas-shift reformer or preferential oxidation reformer may be maintained at a selected temperature, such as any of the temperatures or temperature ranges listed above for the partial oxidation reformer and the steam reformer.

Since the second reformer region 208, in the above-described embodiments, employs exothermic reactions, it may generate more heat than is required to maintain its operating temperature. Thus, the second reformer region 208 may optionally be thermally coupled to the first reformer region 204 by a thermally conductive element 244, allowing these two regions 204 and 208 to share heat. The thermally conductive element 244 is positioned within the reformer 201.

As with other reformer types described above, the water-gas-shift reformer region 208 can include catalysts disposed in any of the configurations mentioned above in connection with reformer region 107. In certain other configurations, the second reformer region 208 is one of the reformer configurations described above in connection with reformer region 107, such as a partial oxidation reformer, a steam reformer, a combination partial oxidation and steam reformer, and a thermal cracking reformer.

In one implementation, the operating temperature of the first reformer region 204 is higher than the operating temperature of the second reformer region 208. With this two-temperature configuration, the first reformer region 204 operates with high reaction rates, even if it is relatively small (e.g., smaller than the second reformer region 208). The high reaction rates of the first reformer region 204 may also result in high production of carbon monoxide. The second reformer region 208 operates at a cooler temperature and thus has lower reaction rates, but burns carbon monoxide produced by the first reformer region 204, preventing the carbon monoxide from entering the fuel cell. Therefore, the two-temperature configuration provides for higher efficiency and selectivity of the second reformer region 208. The two-temperature configuration may be realized by a first heating element 222, with heating element leads 222a and 222b, maintaining the first reformer region 204 at a first temperature, and by a second heating element 224 maintaining the second reformer region 208 at a second temperature lower than the first temperature. In another embodiment, the two-temperature configuration is maintained by the energy created by the reactions occurring in the first 204 and second 108 reformer regions. The heat generated by the reactions may generate and/or maintain the different temperatures.

Although not depicted, the fuel cell assembly 200 can include any number of reformer regions in addition to the reformer regions 204 and 208. In one configuration, the reformer regions are arranged in a row from a left side 201a of the reformer assembly 201 to a right side 201b of the reformer assembly 201, as the depicted reformer regions 204 and 208 are arranged in FIG. 2. In one particular implementation, each reformer region is maintained at a temperature that is lower than the adjacent reformer region to its left. As discussed above, this step-wise decrease in temperatures can improve both reaction rates and efficiencies of the reformer assembly 201.

Figure 3:
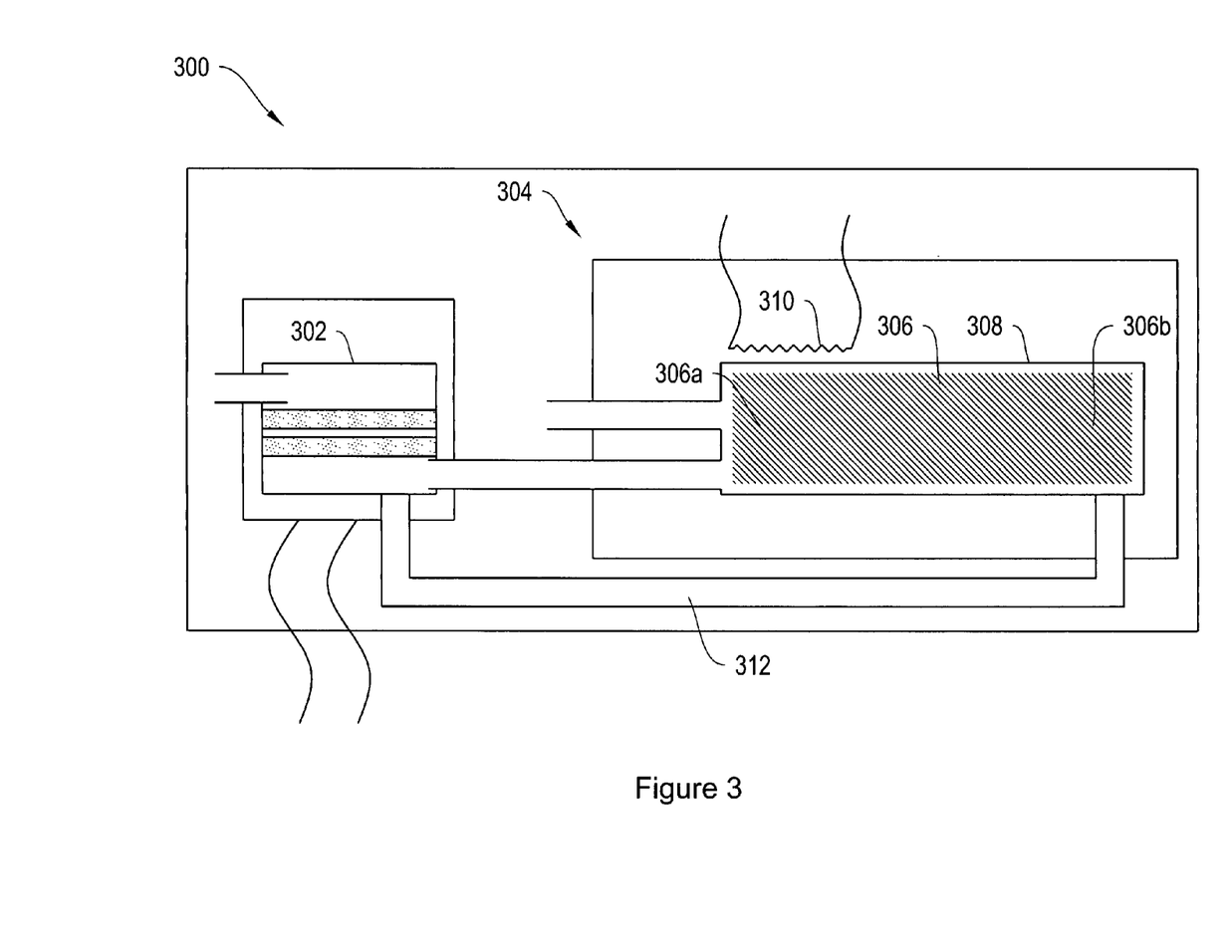
FIG. 3 shows a fuel cell assembly including a fuel cell and a hydrocarbon reformer region having a first end and a second end, with a temperature gradient maintained between the first end and the second end, according to an illustrative embodiment of the invention.

FIG. 3 shows an alternative to including a plurality of reformer regions with step-wise decreases in temperature, wherein the reformer assembly includes a single reformer region that operates in a temperature gradient. FIG. 3 shows a fuel cell assembly 300 similar to the fuel cell assembly of FIG. 1, and including a fuel cell 302 and a reformer assembly 304 having a single hydrocarbon reformer region 306 that is maintained at a temperature gradient and is contained in a reformer housing 308.

More particularly, FIG. 3 depicts a first end 306a of the reformer region 306 that is maintained at a first temperature, and a second end 306b of the reformer region 306 that is maintained at a second temperature lower than the first temperature, wherein the temperature of the reformer region 306 decreases substantially continuously from the first end 306a to the second end 306b. This temperature gradient is beneficial at least in part because the first end 306a of the reformer region 306 operates with high reaction rates, while the second end 306b operates with higher efficiency and selectivity. The heating element 310, similar to the heating element 112 of FIG. 1, maintains the first end 306a of the reformer region 306 at the first temperature. In certain embodiments, the reformer region 306 is made of materials that are sufficiently thermally resistive that maintaining the first end 306a at a sufficiently high temperature is enough to generate the temperature gradient. The different reaction rates at each end 306a and 306b of the reformer region 306 result in different amounts of energy generated, and in some embodiments, the temperature gradient may be generated and/or maintained by the different amounts of energy generated by the reactions. The heat generated from the reaction is balanced against the various heat loss mechanisms to result in the temperature gradient.

Alternatively, in embodiments where the reformer region 306 is an exothermic reformer, a thermally conductive element 312 draws heat away from the second end 306b to keep the second end 306b at a lower temperature. The depicted thermally conductive element 312 draws heat to the fuel cell 302, but this need not be the case.

Figure 4:
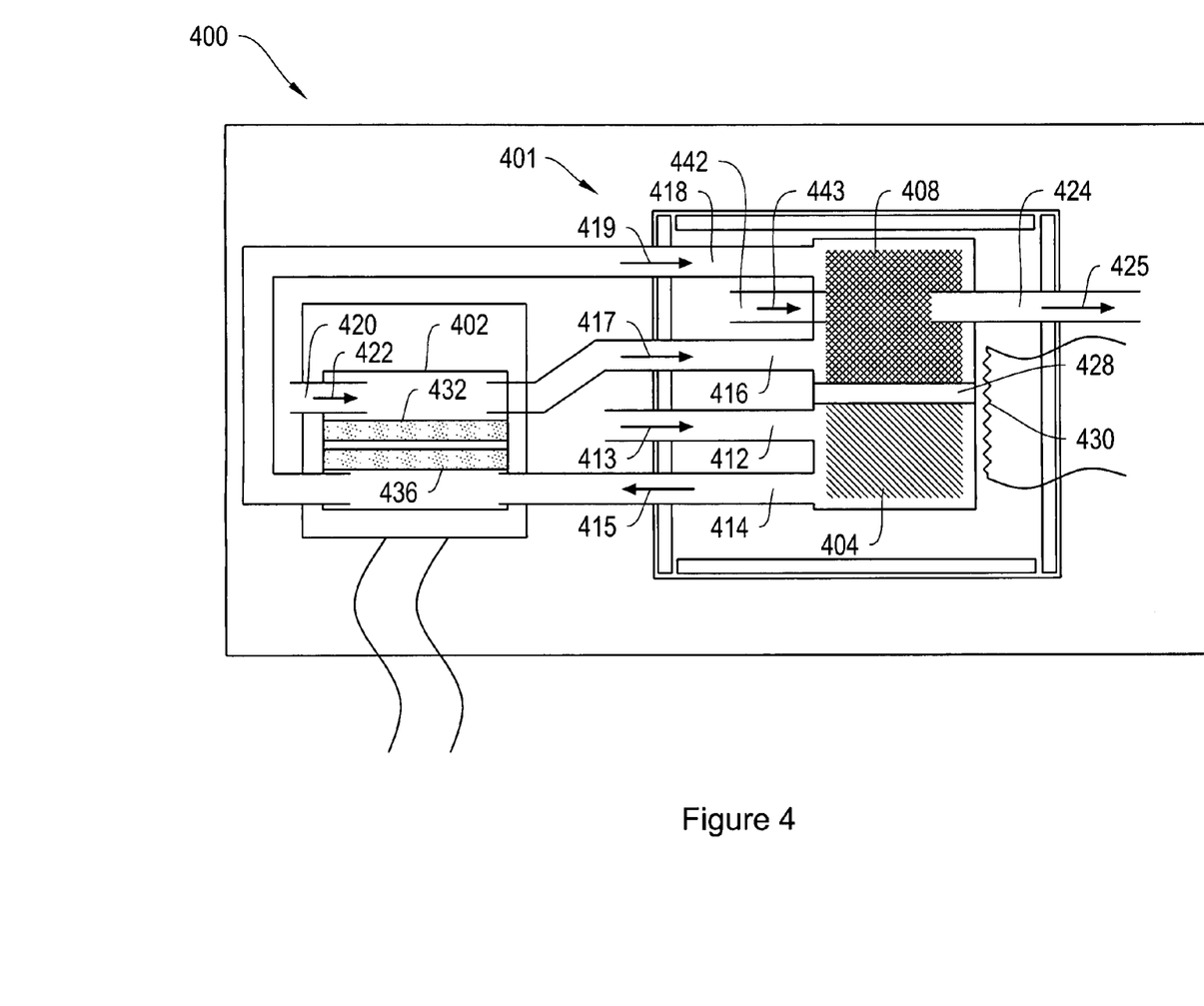
FIG. 4 shows a fuel cell assembly including a fuel cell, a hydrocarbon reformer region, and a chemical heating element according to an illustrative embodiment of the invention.

FIG. 4 shows another illustrative embodiment of a fuel cell assembly 400. In contrast to the fuel cell assemblies described above, which included electrical heating elements 112, 222, 224, and 310, fuel cell assembly 400 heats its reformer region 404 chemically via a chemical heating region 408. More particularly, the fuel cell assembly 400 includes a fuel cell 402 and a hydrocarbon reformer assembly 401 that includes the reformer region 404 and the chemical heating region 408.

In operation, various gas streams flow to the chemical heating region 408 and react with each other and, optionally, catalyst that may be disposed in the chemical heating region 408 to produce heat. The chemical heating region 408 thermally couples to the reformer region 404 by a thermally conductive element 428 disposed between the chemical heating region 408 and the reformer region 404.

Generally, the fuel cell 402 and the reformer region 404 operate similarly to the fuel cell 102 and the reformer region 107 of FIG. 1. More particularly, a fuel stream 413 flows through conduit 412 and is reformed by reformer region 404. The reformer region 404 produces a hydrogen-rich stream 415 that is delivered to the fuel cell 402 through conduit 414. The hydrogen-rich stream 415 contacts the anode 436, while an oxygen stream 422 flows through conduit 420 to contact the cathode 432. The fuel cell 402 produces exhaust materials at the anode 436 and the cathode 432, including, for example, oxygen, water, unreacted hydrogen, carbon dioxide, and/or carbon monoxide. However, as mentioned above, in this configuration the reformer region 404 is heated by the chemical heating region 408.

In one implementation, the chemical heating region 408 generates heat by combusting a hydrocarbon and oxygen. More particularly, a hydrocarbon-based fuel stream 443 flows to the chemical heating region 408 through the conduit 442. The fuel stream 443 may share the same source or may have a different source than the fuel stream 413. In addition, oxygen is provided to the chemical heating region 408 from the exhaust stream 417 of cathode 432 through the conduit 416. In addition, or in the alternative, oxygen may be provided to the chemical heating region 408 from ambient air or a separate oxygen source. The fuel stream 443 combusts with the oxygen in the exhaust stream 417 to produce heat, carbon dioxide, and water. The heat thermally conducts through the thermally conducting element 428, which can be made of any of the thermally conductive materials described herein including platinum or silicon. The carbon dioxide and water can flow through the conduit 424 as an exhaust stream 425. In one alternative, the water can be routed using a conduit (not shown) to the reformer region 404 for use in steam reforming.

In another configuration, a hydrocarbon fuel need not be provided to the chemical heating region 408. Exhaust from the anode 436, including carbon monoxide and/or unreacted hydrogen, flows in the exhaust stream 419 through conduit 418 to the chemical heating region 408, while oxygen in the exhaust stream 417 flows through conduit 416 also to the chemical heating region 408. In the presence of a suitable catalyst, the carbon monoxide reacts with the oxygen, and the hydrogen reacts with the oxygen to produce at least heat and water. As in above-described embodiments, the heat conducts to the reformer region 404, and the water either exits the reformer assembly 401 as exhaust 425 or is routed to the reformer region 404 for use in steam reforming. The chemical heating region 408 can be used alone or in combination with a resistive heating element 430 to provide the necessary heat to the reforming region 404.

In the various embodiments discussed above, conduits, such as conduits 418, 416, 412, 442, 424, 210, 216, 214, 212, 116, 114, or any of the other conduits depicted herein, fluidicly interconnect components within the fuel cell assemblies, such as fuel cell assembly 400, 300, 200, or 100. Speaking in reference to the exemplary conduit 412, the conduit 412 may be a channel (i.e., a microchannel) etched into a substrate. In other embodiments, the conduits are tubes or tubes fabricated to have an especially narrow inner diameter, known as a capillary. The conduit can be made of a variety of materials, including metals or alloys such as stainless steel. In other embodiments, materials are chosen to provide lower heat loss. Such materials include silicon nitride, ceramics such as silicon nitride-based ceramics, and/or glass.

Exemplary wall thicknesses for stainless steel conduits include between about 100 microns and about 400 microns, and in certain embodiments can be about 325 microns for a tube or about 125 microns for a capillary. Exemplary ratios of the length of the conduit to the outer diameter of the conduit for stainless steel conduits include about 10:1 for tubes and about 20:1 for capillaries.

As mentioned above, the use of conduits made from materials such as silicon nitride and glass can result in lower heat loss than the use conduits made from materials such as stainless steel. Exemplary wall thicknesses for silicon nitride conduits include between about 1 micron and about 200 microns, with an exemplary ratio of conduit length to conduit outer diameter of about 10:1. Other exemplary ratios of conduit length to conduit outer diameter for silicon nitride conduits include 5:1, 7:1, 12:1, 15:1, and 20:1. Exemplary wall thicknesses for glass conduits include between about 1 micron and about 200 microns, with an exemplary ratio of conduit length to conduit outer diameter of about 15:1. Other exemplary ratios of conduit length to conduit outer diameter for glass conduits include 5:1, 7:1, 10:1, 12:1, 20:1, 25:1, and 30:1. These thin walls and materials with low thermal conductivity, such as silicon nitride and glass, are beneficial at least in part to improve the thermal efficiency of the fuel cell assembly 400 by preventing heat from dissipating through the conduits and away from the fuel cell components that require high operating temperatures. In certain embodiments, the conduit has a wall-thickness of less than about 50 microns. Table 2 sets forth certain conduit embodiments, along with their thermal conductivity, wall thickness, ratio of conduit length to conduit diameter, and power loss per conduits.

TABLE 2

Comparison of conduit materials. (The power loss Q assumes a total temperature drop of 700° C.)

| Conduit type | Thermal conductivity W/cm-k | wall thickness (microns) | Conduit length/ diameter (mm/mm) | power loss per conduit: Q (watts) |
|---|---|---|---|---|
| ⅛" stainless steel tube | 0.25 | 325 | 30/3 | 1.9 |
| stainless steel capillary | 0.25 | 125 | 20/1 | 0.35 |
| thin wall silicon nitride | 0.4 | 2 | 3/0.5 | 0.03 |
| glass capillary | 0.01 | 125 | 5/1 | 0.05 |

Other features and configurations for the conduits are disclosed in U.S. Pat. No. 6,939,632, the contents of which are incorporated by reference herein in their entirety.

Exemplary fuels for use in the systems and methods described herein include straight and branched chain alkanes, alkenes, alkynes, alkanols, alkenols, and alkynols; cycloalkanes; cycloalkenes; cycloalkanols; cycloalkenols; aromatic compounds including, but not limited to toluene, xylene, and benzene; ketones, aldehydes, carboxylic acids, esters, ethers, sugars, and generally other organic compounds containing carbon, hydrogen, and optionally oxygen. One exemplary group of fuels includes alkanes such as methane, ethane, and the various isomers of propane, butane, pentane, hexane, heptane, and octane. Alkenes corresponding to the listed alkanes may also be used in the present invention. In addition or in the alternative, alcohols can be used in the present invention. Exemplary alcohols include methanol, ethanol, ethylene glycol, propylene glycol, and the various isomers of propanol, butanol, pentanol, hexanol, heptanol, and octanol. Other fuels include cyclohexane and cyclopentane. One exemplary group of fuels includes methane, methanol, ethane, ethanol, acetic acid, ethylene glycol, pentene, pentane, cyclohexane, benzene, toluene, iso-octane, and gasoline.

Other exemplary fuels for use in the present invention include mixtures such as natural gas, which primarily includes methane, and gasoline or diesel which both include a mixture of various compounds. One exemplary group of fuels for use in the present invention includes methane, methanol, ethane, ethylene, ethanol, propane, propene, i-propanol, n-propanol, butane, butene, butanol, pentane, pentene, hexane cyclohexane, cyclopentane, benzene, toluene, xylene, natural gas, liquefied petroleum gas, iso-octane, gasoline, kerosene, jet fuel, and diesel. Other fuels include methane, natural gas, propane, methanol, ethanol, liquefied petroleum gas, gasoline, kerosene, jet fuel, and diesel.

Exemplary catalyst materials include platinum, rhodium, ruthenium, iridium, nickel, rare earth oxides, palladium, cobalt, tin, oxides thereof, or composites thereof. Exemplary materials for anodes described herein include cermet composites such as nickel and YSZ cermets, platinum, silver, palladium, iron, cobalt, ceria, other oxide matrix materials, or combinations thereof. The cathodes can be constructed from lanthanum (strontium) manganate (LSM), lanthanaum (strontium) cobaltite (LSC), and lanthanum (strontium) cobalt-ferrite (LSCF). The electrolyte layers described herein can be made of yttria-stabilized zirconia (YSZ) and/or doped ceria materials. Other materials, configurations, and fabrication methods for the electrolyte layers are described in PCT application WO 2005/030376, incorporated herein by reference in its entirety.

Other systems, methods, and configurations for hydrogen reformers are disclosed in the publications US 2005/0008909, US 2004/0163311, US 2005/0069737, US 2004/0043273, US 2005/0207953, US 2002/0031690, US 2005/0252081, US 2005/0014040, US 2004/0179980, US 2004/0223908, US 2004/0072039, US 2005/0255368, US 2005/0008911, US 2005/0014059, US 2005/0186455, and U.S. Pat. No. 6,126,908, the contents of which are incorporated herein by reference in their entireties.

As mentioned, the fuel cells described herein, such as fuel cell 102, can include a plurality of fuel cells arranged in various configurations. Exemplary arrangements of fuel cells and other features that can be used in operative combination with the fuel cells include those described in U.S. Patent and Publication Nos. 2005/0069737; 2005/0132648; U.S. Pat. No. 6,939,632; 2004/0241061; 2004/0072039; 2005/0249993; U.S. Pat. No. 6,680,139; 2004/0028975; U.S. Pat. Nos. 6,852,436; 6,623,881; 2003/0096147; 2005/0221131; U.S. Pat. Nos. 5,925,477; 5,190,834; 5,479,178; 6,183,897; and 5,595,833, all of which are incorporated herein by reference in their entireties.

What is claimed is:

1. A fuel cell assembly, comprising:
    a reformer housing;
    a reformer region within the reformer housing for producing hydrogen;
    a vacuum housing for containing the reformer housing;
    a low-pressure insulating region between the reformer housing and the vacuum housing for providing thermal insulation;
    radiation shields disposed about the reformer region for providing radiation insulation; and at least one proton-exchange-membrane fuel cell in fluid communication with the reformer region;

wherein the vacuum housing defines a volume of less than about 30 cubic centimeters.

2. The assembly of claim 1, wherein the at least one fuel cell produces a voltage differential of less than about 10 volts.

3. The assembly of claim 1, wherein the at least one fuel cell produces less than about 100 watts of power.

4. The assembly of claim 1, further comprising a tube in fluidic communication with the reformer region for delivering fuel to the reformer region, wherein at least a portion of the tube has a wall-thickness of less than about 50 microns.

5. The assembly of claim 1, further comprising
a heating element thermally coupled to the reformer region for heating the reformer region, and
a conduit in fluidic communication with the fuel cell and the heating element for providing exhaust from the fuel cell to the heating element.

6. The assembly of claim 5, wherein the conduit is in fluidic communication with one or more anodes of the at least one fuel cell and is for providing one or more of hydrogen, water, and carbon monoxide to the heating element.

7. The assembly of claim 6, further comprising a conduit in fluidic communication with one or more cathodes of the at least one fuel cell and the heating element for providing oxygen to the heating element.

8. The assembly of claim 1, wherein the reformer region comprises at least one of a steam reformer, an aqueous shift reformer, a thermal cracking reformer, and a preferential oxidation reformer.

9. The assembly of claim 1, wherein the reformer region comprises a partial oxidation reformer.

10. The assembly of claim 1, wherein the reformer region produces hydrogen at a temperature of more than about 300 degrees Celsius.

11. The assembly of claim 1, wherein the reformer region comprises a partial oxidation reformer for producing hydrogen and for maintaining the temperature of the reformer region at more than about 300 degrees Celsius.

12. The assembly of claim 1, wherein the reformer and the fuel cell are thermally coupled.

13. The assembly of claim 1, further comprising a second reformer region at a lower temperature than the first reformer region for at least one of burning carbon-monoxide and producing additional hydrogen.

14. The assembly of claim 13, further comprising a third reformer region at a lower temperature than the second reformer region for producing additional hydrogen.

15. The assembly of claim 13, further comprising a third reformer region at a lower temperature than the second reformer region for burning additional carbon monoxide.

16. The assembly of claim 1, wherein the reformer region comprises: a first end at a first temperature for receiving fuel and providing hydrogen, a second end at a second temperature for providing hydrogen, and a temperature gradient between the first end and the second end, wherein the first temperature is higher than the second temperature.

* * * * *